United States Patent [19]

Christoffel

[11] Patent Number: 4,705,435
[45] Date of Patent: Nov. 10, 1987

[54] REAMER

[75] Inventor: Johannes Christoffel, Gipf-Oberfrick, Switzerland

[73] Assignee: Dihart AG, Dulliken, Switzerland

[21] Appl. No.: 908,050

[22] Filed: Sep. 16, 1986

[30] Foreign Application Priority Data

Sep. 19, 1985 [EP] European Pat. Off. ........ 85111675.6

[51] Int. Cl.⁴ .............................................. B23D 77/10
[52] U.S. Cl. ........................................ 408/59; 407/11; 408/171
[58] Field of Search ................... 408/59, 82, 156, 169, 408/170, 171; 409/230, 231, 232, 233, 234; 407/11

[56] References Cited

U.S. PATENT DOCUMENTS

| 1,296,536 | 3/1919 | Leech | 407/11 X |
| 2,983,166 | 5/1961 | Davidson | 408/156 |
| 4,606,680 | 8/1986 | Striegl | 408/59 X |

FOREIGN PATENT DOCUMENTS 329115 5/1958 Switzerland .
449390 12/1967 Switzerland .

Primary Examiner—Z. R. Blinsky
Attorney, Agent, or Firm—Ladas & Parry

[57] ABSTRACT

A coolant and lubricant is supplied to the cutter head through the shank of a reamer. For this purpose an axial channel extends through the reamer shank and encloses in its front part a conical screw used for adjusting the cutter head and whose threaded shank has at least one longitudinal slot, so that the coolant and lubricant passes through the threaded shank into a ring channel in the front region of the reamer. The coolant and lubricant flows from said ring channel via outlet channels between the cutters. The outlet channels slope outwards in the direction of the leading edge of the cutters, so that an optimum cooling and lubrication of the latter is obtained.

9 Claims, 8 Drawing Figures

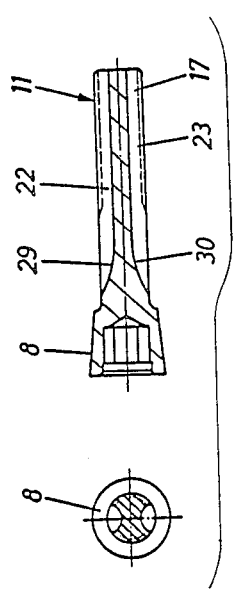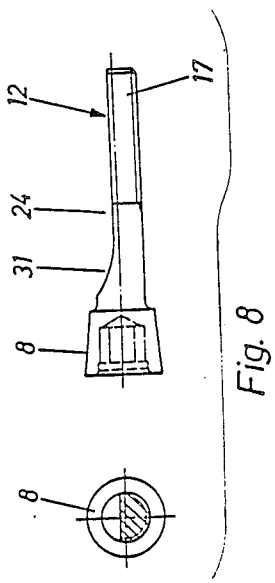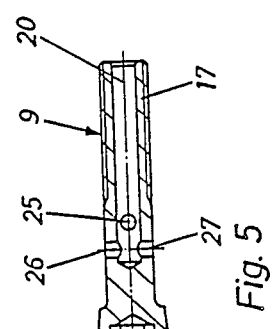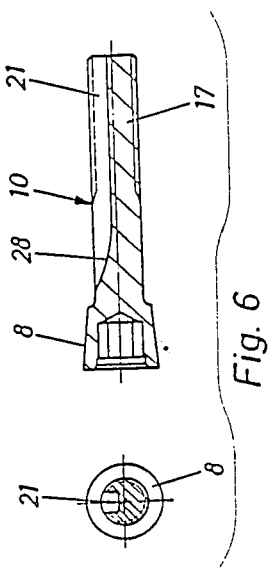

[4,705,435]

REAMER

BACKGROUND OF THE INVENTION

The invention relates to a reamer with coolant supply through an axial channel of the reamer shank and at least one coolant outlet located in the vicinity of the cutter head.

A reamer of this type is e.g. known from Swiss Pat. No. 449,390.

SUMMARY OF THE INVENTION

The problem of the invention is to permit an improved coolant supply to reamers, whose cutter head is adjustable by a conical screw.

According to the invention this problem is solved by a reamer, whose axial channel passes upstream of the cutter head into a tapped hole receiving the screwed shank of a conical screw and then into a hollow cylindrical part of the reamer shank expansible by the conical screw and which has the cutter head, so that a ring channel is enclosed between the hollow cylindrical shank part and the conical screw.

BRIEF DESCRIPTION OF THE DRAWINGS

The invention is described in greater detail hereinafter relative to non-limitative embodiments and the attached drawings, wherein show:

FIG. 5, an axial section through a first embodiment of a conical screw of a reamer according to the invention.

FIG. 6, an axial and radial section through a second embodiment of a conical screw.

FIG. 7, an axial and radial section through a third embodiment of a conical screw.

FIG. 8, a side view and radial section through a fourth embodiment of a conical screw.

Figure 1:
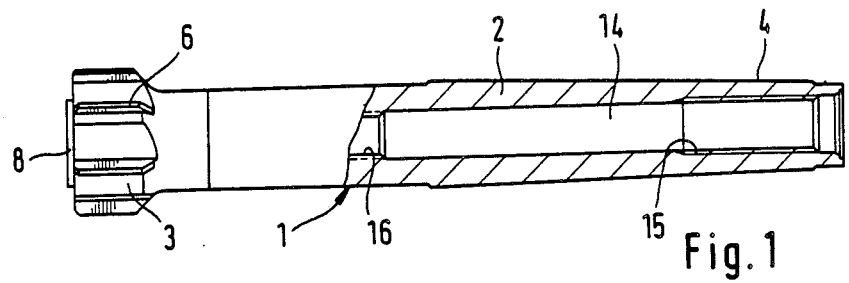
FIG. 1, a part axially sectional overall view of a reamer.
Figure 2:
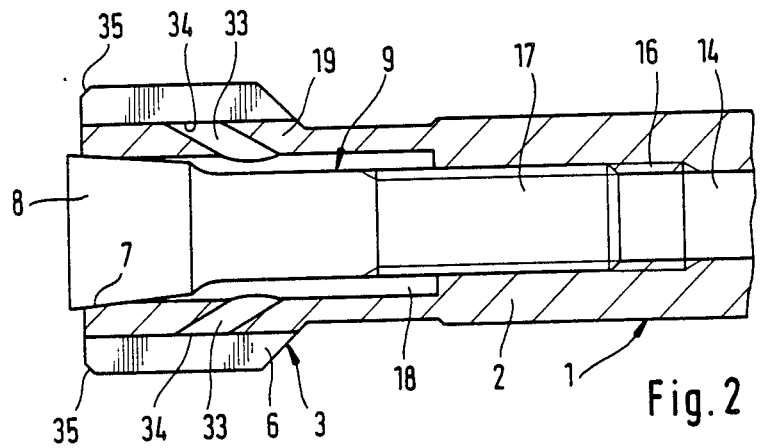
FIG. 2, an axial section through the front part of the reamer having the cutter head in accordance with FIG. 1, but on a larger scale.
Figure 3:
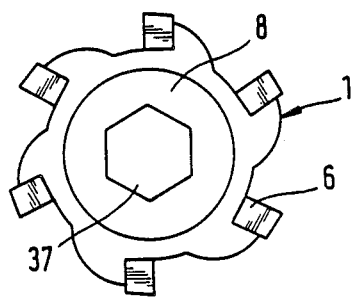
FIG. 3, a front view of the cutter head of the reamer according to FIG. 2.
Figure 4:
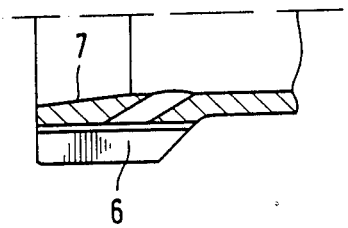
FIG. 4, an axial part section in the vicinity of the cutter head of a reamer with omitted conical screw.

Reamer 1 has a shank 2, onto whose front end is integrally shaped the cutter head 3 and whose rear end 4 is received in a conventional machine tool holding chuck.

As is known per se from Swiss Pat. No. 329,115, the cutter head 3 carrying the carbide cutters 6 is adjustable in accordance with the amount of wear to the latter, in that it is hollow and has a conical inner wall 7, against which rests the conical head 8 of a conical screw 9, 10, 11, 12, which is screwed into shank 2 for expansion purposes. For this purpose, the conical screw extends through the entire front region of reamer 1 and through which, according to the invention, the coolant and lubricant is supplied.

For supplying the coolant and lubricant, an axial channel 14 extends through shank 2 and is provided in the rear part of reamer 1 with an internal thread 15 for the secure connection to the machine tool and which in the front part of reamer 1 has another internal thread 16, in which engages the threaded shank 17 of conical screw 9–12.

In order to permit the supply of coolant and lubricant through the threaded shank 17 of the conical screw to a ring channel 18 located between the conical screw 9–12 and the wall 19 of hollow cutting head 3, in the latter is provided an axial coolant and lubricant channel 20 (FIG. 5) or at least one axially parallel coolant and lubricant channel 21–24 (FIGS. 6 and 8), which extends from the end of threaded shank 17 and issues into ring channel 18 via at least one opening 25–27 or a run-out part 28–31.

Coolant and lubricant is supplied from ring channel 18 through at least one outlet channel 33, which extends through the wall 19 of the hollow cutter head 3, directly between the carbide cutters 6, so that the latter are subject to optimum cooling and lubrication and it is also possible to better wash away chips. Preferably in each case one or more outlet channels 33 issue into each gap between two carbide cutters 6 and preferably towards the front end of the cutter head 3 or its cutters 6, under an angle in the range 30° to 45°. In the case of a preferred arrangement of the outlet openings 34 of outlet channels 33 in the axial central region of cutters 6, the discharged coolant and lubricant jet is directed just upstream of the leading edge 35 of cutters 6, so that the coolant and lubricant flows in an intense manner around this most stressed region.

For an optimum strong, cooling, lubricating and washing action, a maximum number of flow cross-sections are to be provided in the reamer, whilst taking account of the strength requirements, particularly with respect to the conical screw. It has been found that the diameter-limited conical screw, despite the weakening of the cross-section of its threaded shank 17 by one or more coolant and lubricant channels 20–24 in accordance with the embodiments of FIGS. 5 to 8, can still be loaded in an adequate manner to expand the cutter head 3 and without any risk of the conical screw fracturing. The tightening torque for conical screw 9–12 is applied by means of a tool engaging in the hexagonal recess 37 of screw head 8.

Strength tests performed on conical screw 9–12 with the cross-sectional shaped shown in FIGS. 5 to 8 and with an identical overall cross-section of the coolant and lubricant channels 20–24 of the conical screws being compared, have revealed that an axial channel 20 leads to the minimum weakening of conical screw 9, whereas the greatest weakening occurs with a one-sided flattening of the shank cross-section in accordance with the embodiment of FIG. 8, although the latter is also suitable for the purposes of the invention.

What is claimed is:

1. A reamer with coolant supply, the reamer comprising:
   a reamer shank having an axial channel to convey coolant, the axial channel having a widened portion and an internally threaded portion therein;
   a cutter head about an end of the reamer shank, the cutter head having a plurality of cutters and an outlet port extending from the axial channel to outside of the cutter head between the cutters; and
   a conical screw accommodated in the axial channel and extending through the widened portion thereof to expand the reamer shank at the cutter head, the conical screw having an at least partially threaded shank for connection to the internally threaded portion of the reamer shank and a coolant passage, the reamer shank and conical screw defining therebetween at the widened portion an annular ring channel, so that coolant supplied to the axial channel flows through the coolant passage to the ring channel and out of the outlet ports.

2. A reamer as claimed in claim 1 wherein the outlet port is located in the axially central region of the cutters.

3. A reamer as claimed in claim 1 wherein the outlet port includes an outlet channel and wherein the outlet channel is at an angle with respect to the reamer shank axis, the outlet channel extending in a direction towards the cutter head end of the reamer shank.

4. A reamer as claimed in claim 1 wherein the threaded shank of the conical screw is a hollow cylindrical portion, and at least one opening is provided in the conical screw in the region of the ring channel.

5. A reamer as claimed in claim 1 wherein the shank of the conical screw comprises at least one longitudinal slot extending from an outer end into the region of the ring channel.

6. A reamer as claimed in claim 1 wherein the shank of the conical screw is flattened on one side in the region of the ring channel.

7. A reamer with coolant supply, the reamer comprising:
 a reamer shank having an axial channel to convey coolant, the axial channel having a widened portion and an internally threaded portion therein;
 a cutter head at one end of the reamer shank, the cutter head having a plurality of cutters and an outlet port extending from the axial channel to outside of the cutter head between the cutters; and
 a conical screw accommodated in the axial channel and extending through the widened portion thereof to expand the reamer shank at the cutter head, the conical screw having an at least partially threaded shank which is hollow and has at least one opening in the region of the widened portion and being connected to the internally threaded portion of the reamer shank, the conical screw further comprising a coolant passage, the reamer shank and conical screw defining therebetween at the widened portion an annular ring channel so that coolant supplied to the axial channel flows through the coolant passage to the ring channel and out of the outlet ports.

8. A reamer as claimed in claim 7 wherein the shank of the conical screw has at least one longitudinal slot extending from an outer end into the region of the ring channel.

9. A reamer as claimed in claim 7 wherein the shank of the conical screw is flattened on one side in the region of the ring channel.

* * * * *

UNITED STATES PATENT AND TRADEMARK OFFICE
CERTIFICATE OF CORRECTION

PATENT NO. : 4,705,435
DATED : November 10, 1987
INVENTOR(S) : Johannes Christoffel It is certified that error appears in the above-identified patent and that said Letters Patent is hereby corrected as shown below:

Title page, Foreign Application Priority Data: Change "Sep. 19, 1985" to read --Sep. 16, 1985--.

Signed and Sealed this

Twelfth Day of April, 1988

*Attest:*

DONALD J. QUIGG

*Attesting Officer*   *Commissioner of Patents and Trademarks*